United States Patent [19]

Shin

[11] Patent Number: 5,345,271
[45] Date of Patent: Sep. 6, 1994

[54] APPARATUS FOR SEPARATING VERTICAL SYNCHRONIZING SIGNAL COMPONENTS FROM IMAGE SIGNALS IN VIDEO CASSETTE RECORDER

[75] Inventor: Woo C. Shin, Seoul, Rep. of Korea

[73] Assignee: Goldstar Co., Ltd., Seoul, Rep. of Korea

[21] Appl. No.: 5,053

[22] Filed: Jan. 15, 1993

[30] Foreign Application Priority Data

Jan. 18, 1992 [KR] Rep. of Korea .................. 666/1992

[51] Int. Cl.$^5$ .............................................. H04N 5/08
[52] U.S. Cl. ................................... 348/525; 348/529; 348/533; 358/319; 358/312; 360/38.1
[58] Field of Search .............. 358/148, 153, 154, 155, 358/156, 157, 149, 319, 312, 314, 315, 327, 336, 340; 360/9.1, 10.1, 10.2, 10.3, 11.1, 37.1, 38.1; 348/500, 525, 529, 532, 533, 534; H04N 5/08, 5/01

[56] References Cited

U.S. PATENT DOCUMENTS

| | | | |
|---|---|---|---|
| 3,569,844 | 3/1971 | Lynn | 358/153 |
| 4,204,219 | 5/1980 | Uchida | 348/533 |
| 4,254,435 | 3/1981 | Dayton et al. | 358/153 |
| 4,414,569 | 11/1983 | Takuda et al. | 358/153 |
| 4,707,740 | 11/1987 | Stratton | 348/532 |
| 5,003,406 | 3/1991 | Hatanaka et al. | 360/10.3 |

FOREIGN PATENT DOCUMENTS

| | | | |
|---|---|---|---|
| 0030727 | 3/1979 | Japan | 358/155 |
| 0078281 | 6/1981 | Japan | 358/155 |
| 0187078 | 11/1983 | Japan | 358/153 |
| 0220585 | 12/1983 | Japan | 358/155 |
| 0060884 | 4/1984 | Japan | 358/153 |
| 0051381 | 3/1985 | Japan | 360/37.1 |

*Primary Examiner*—James J. Groody
*Assistant Examiner*—Michael Lee
*Attorney, Agent, or Firm*—Birch, Stewart, Kolasch & Birch

[57] ABSTRACT

An apparatus for separating vertical synchronizing signal components from image signals in a VCR of a double rotation head helical scanning system. The apparatus comprises a level detecting unit for detecting the level of an output signal from an amplifying unit, a comparing unit for comparing the output signal from the level detecting unit with a reference voltage ($V_1$), a switching unit operable according to the output signal from the comparing unit, and a limiting unit for limiting an output signal from a demodulating unit to a predetermined limit voltage ($V_2$) via the switching unit upon the operation of the switching unit. The apparatus achieves an accurate separation of vertical synchronizing signal components in all cases of using a combined head for a SP/LP mode and using a single head for a SP mode or a LP mode.

9 Claims, 6 Drawing Sheets

FIG.4
prior art
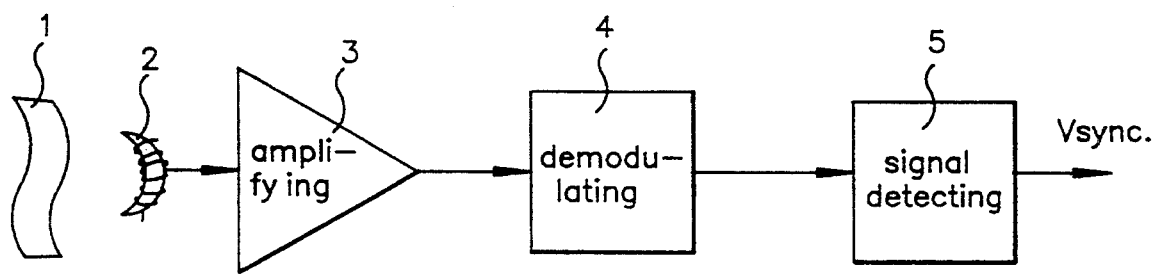
FIG.5a
prior art
FIG.5b
prior art
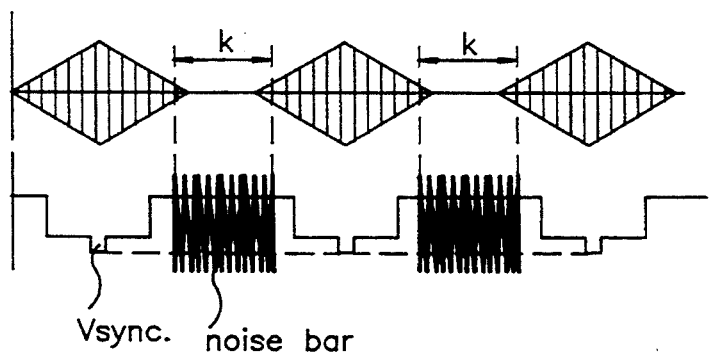

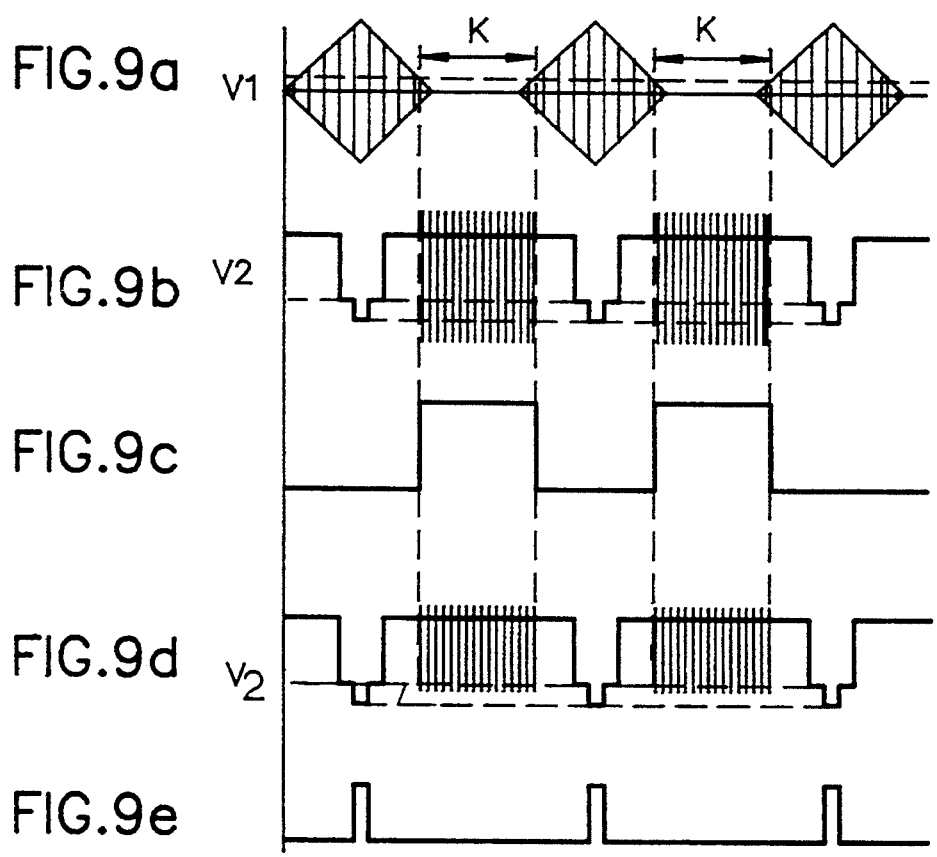

APPARATUS FOR SEPARATING VERTICAL SYNCHRONIZING SIGNAL COMPONENTS FROM IMAGE SIGNALS IN VIDEO CASSETTE RECORDER

BACKGROUND OF THE INVENTION

1. Field of the Invention

The present invention relates to a video cassette recorder (VCR), and more particularly to an apparatus for separating vertical synchronizing signals from image signals in the VCR.

2. Description of the Prior Art

For promoting the understanding of the present invention, scanning and synchronization will be described, before describing the prior art.

As shown in FIG. 1, image signals played back from a VCR tape are displayed on a cathode ray tube (CRT) of a monitor or a television in a sequential manner that a first signal line is displayed on the uppermost portion of the CRT in the right direction and a return is %hen made in the left direction for displaying a next signal line, that is, a second line 2 in the same right direction, as shown in FIG. 1.

Such a sequential displaying of image signal lines is called a scanning.

For displaying a frame as shown in FIG. 1, substantial time is taken, in that 525 scanning times for one frame are required. This 525 scanning times corresponds to the broadcast system of National Television System Committee (NTSC) and means the number of scanning lines constituting one frame.

Also, the substantial scanning time means that a flickering occurs on a screen. In actuality, most television systems adopt an interlaced scanning in which scanning is made for every other scanning lines and then for remaining scanning lines, so as to avoid the flickering phenomenon. In other words, 262.5 scanning times ($\frac{1}{2}$ of 525 scanning times) repeated two times for displaying one frame.

Scanning carried out in the horizontal direction is called a horizontal scanning, whereas scanning carried out in a vertical direction is called a vertical scanning.

In an interlaced scanning of the NTSC broadcast system, 30 frames are displayed in a second. Each frame is also displayed by two interlaced scannings. That is, the time taken for the scanning from a point a to a point c via a point b is 1/60 second, in FIG. 2.

In FIG. 2, the point a is a start point for making a first frame, the point b an end point for making the first frame, the point c a start point for making a second frame, and the point d an end point for making the second frame.

For displaying one image signal line, accordingly, a time of 1/15,750 second is taken, as expressed in the following equation (1):

$$1/30 \text{ (second)} \div 525 = 1/15,750 \text{ (second)} \quad (1)$$

For displaying accurately one frame, the same point should be scanned at the transmitting side and the receiving side at the same time. Such a scanning is called a synchronization. Herein, the transmitting side means a VCR tape, whereas the receiving side means a CRT of a monitor or a television.

Accordingly, each image signal recorded on the VCR tape includes both horizontal synchronizing signal components and vertical synchronizing signal components. The horizontal synchronizing signal components are signals for achieving the sequential return carried out in a direction from the rightmost end of the screen and to the leftmost end of the screen. On the other hand, the vertical synchronizing signal components are signals for achieving the sequential return carried out in a direction from the lowermost end of the screen and to the uppermost end of the screen.

When horizontal synchronizing signal components are omitted, inclined lines are generated on a frame. On the other hand, when vertical synchronizing signals are omitted, the frame is moved downwardly or upwardly.

FIG. 3 is a waveform of NTSC broadcast signals in the interlaced scanning system.

By virtue of the above-mentioned reason, it is very important to accurately separate horizontal and vertical signals from an image signal recorded on a VCR tape, upon the play-back operation of VCR.

Referring to FIG. 4, there is illustrated a conventional apparatus for separating vertical synchronizing signal components from image signals. As shown in FIG. 4, the apparatus comprises a head 2 for playing back frequency-modulated image signals recorded on a VCR tape 1, an amplifying unit 3 for amplifying the frequency-modulated image signals played back by the head 2 at a predetermined amplification factor, a demodulating unit 4 for demodulating an output signal from the amplifying unit 3 into an original composite signal comprising a color signal component and a luminance signal component, and a signal detecting unit 5 for detecting vertical synchronizing signal components $V_{sync}$ from the original composite image signal.

The construction of the signal detecting unit 5 is well known and thus its description will be omitted. The head 2 may be a head having a standard play (SP) function or a long play (LP) function. It may be also a head having a combined SP/LP function. In either case, the head is applied to VCRs of the double rotation head helical scanning system.

Now, the operation of the above-mentioned conventional apparatus will be described.

First, the head 2 plays back image signals recorded on the VCR tape 1 and sends them to the amplifying unit 3. Generally, the image signals recorded on the VCR tape 1 are signals obtained by frequency-modulating original composite image signals.

The amplifying unit 3 amplifies the received image signals at a predetermined amplification factor and then send them to the demodulating unit 4. The demodulating unit 4 demodulates the image signals received from the amplifying unit 3, to obtain original composite image signals.

The signal detecting unit 5 detects vertical synchronizing signal components from composite image signals shown in FIG. 3 and outputs them. These vertical synchronizing signal components $V_{sync}$ importantly serves to distinguish frames from one another.

However, the above-mentioned apparatus has the following problems. Generally, a VCR currently used has a head having a width of 49 $\mu$m for the SP mode or a head having a width of 30 $\mu$m for the LP mode. In most VCRs of the double rotation head helical scanning system, a combined SP/LP type head having a width of about 37 $\mu$m is used for reducing the manufacture cost, since the head accounts for a considerable portion of the manufacture cost. In all cases of using heads for the SP mode, the LP mode and the combined SP/LP mode, however, a problem occurs upon separating vertical synchronizing signal components from image signals played back during SP/LP or variable playback operations.

For example, where the VCR is equipped with a combined SP/LP type head having a width of about 37 $\mu$m and performs the playback mode (QUE mode or REVIEW mode) or the SP/LP mode, the guard band is greatly increased, as shown in FIG. 6, when the combined SP/LP type head carries out a variable playback operation at a velocity of 5 times or a normal SP/LP operation. This is because the width (37 $\mu$m) of the head is less than a predetermined width (49 $\mu$m) by about 12 $\mu$m.

In the VCR having two heads A and B for SP/LP operation, its head A plays back only signals on channels A, without playing back signals on channels corresponding to the head B, as shown in FIG. 6. As a result, the signals on the channels B become guard bands, so that the substantial guard bands are increased even further, as compared with predetermined guard bands. These guard bands causes noise bars during the variable playback operation or the SP/LP operation of VCR, since no image signal is recorded on the guard bands.

On the other hand, a guard band with a small width is provided at the right edge portion of each image track of VCR tape, so as to isolate adjacent image tracks from each other during the SP/LP operation of VCR, as shown in FIG. 7. Where the combined SP/LP type head with the small width of 37 $\mu$m is used, the guard bands are also increased.

That is, the amplifying unit 3 of FIG. 4 outputs no frequency-modulated image signal or frequency-modulated image signals with a small level at guard band intervals K, as shown in FIG. 5a. As a result, the demodulating unit 4 of FIG. 4 outputs signals with severe noise bars at the guard band intervals K, as shown in FIG. 5b.

Such noise bars are generally exhibited with a level lower than the low level of vertical synchronizing signal components. Due to such noise bars, accordingly, the signal detecting unit 5 of FIG. 4 which is adapted to detect only the vertical synchronizing signal components with the low level can not detect accurately the vertical synchronizing signal components from the demodulated signals.

As apparent from the above description, the conventional VCRs of the double rotation head helical scanning system can not separate vertical synchronizing signal components from image signals, in all cases of using a single type head for a SP or LP mode and a combined type head for SP/LP mode. As a result, such VCRs can not also performs accurately an on screen display (OSD) function.

SUMMARY OF THE INVENTION

Therefore, an object of the invention is to eliminate the above-mentioned problems encountered in the prior art and to provide an apparatus for separating vertical synchronizing signal components from image signals in a VCR of a double rotation head helical scanning system, capable of achieving an accurate separation of vertical synchronizing signal components in all cases of using a combined head for a SP/LP mode and using a single head for a SP mode or a LP mode.

In accordance with the present invention, this object is accomplished by providing an apparatus for separating vertical synchronizing signal components from a composite image signal played back from a tape in a video cassette recorder, comprising: amplifying means for amplifying the composite image signal frequency-modulated; demodulating means for demodulating an output signal from the amplifying means, to generate a composite image signal with an original frequency; level detecting means for detecting the level of the output signal from the amplifying means; comparing means for comparing an output signal from the level detecting means with a predetermined reference value; switching means operable according to an output signal from the comparing means; limiting means for limiting an output signal from the demodulating means to a predetermined limit value upon the operation of the switching means; and signal detecting means for detecting vertical synchronizing signal components from the output signal from the demodulating means.

BRIEF DESCRIPTION OF THE DRAWINGS

Other objects and aspects of the invention will become apparent from the following description of embodiments with reference to the accompanying drawings in which:

FIG. 4 is a block diagram of a conventional apparatus for separating vertical synchronizing signal components from image signals;

FIGS. 5a and 5b are waveform diagrams of output signals of the apparatus of FIG. 4;

FIGS. 9a to 9e are waveform diagrams of output signals of the apparatus of FIG. 8.

DETAILED DESCRIPTION OF THE PREFERRED EMBODIMENTS

Figure 8:
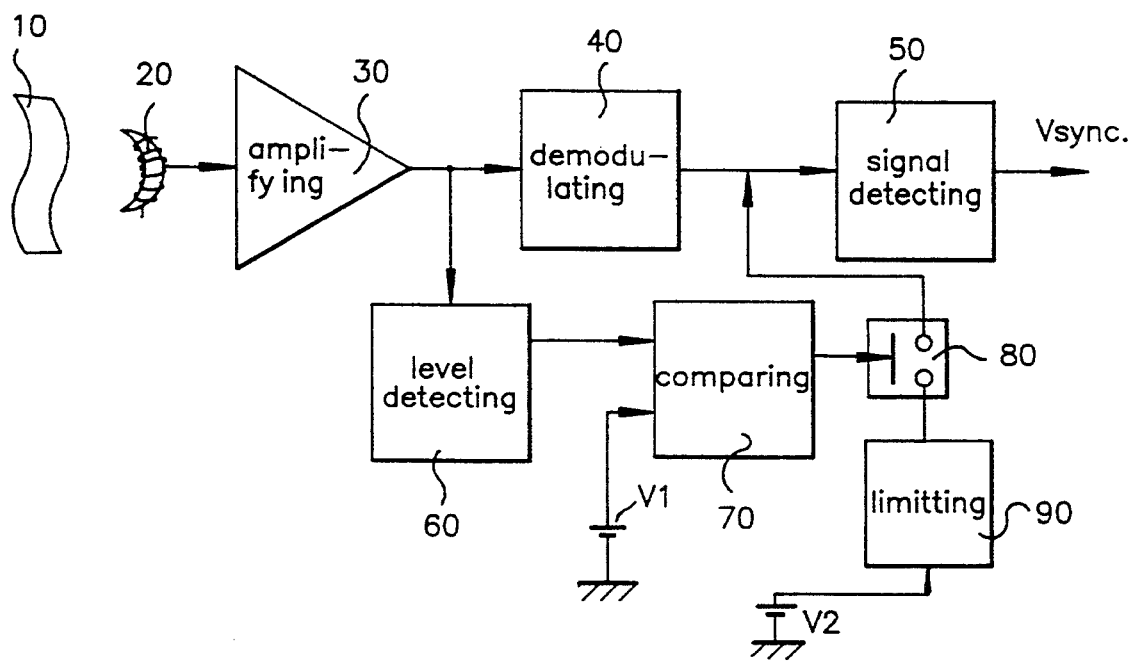
FIG. 8 is a block diagram of an apparatus for separating vertical synchronizing signal components from image signals. in accordance with the present invention.

Referring to FIG. 8, there is illustrated a block diagram of an apparatus for separating vertical synchronizing signal components from image signals in a VCR of the double rotation head helical scanning system, in accordance with the present invention. As shown in FIG. 8, the apparatus comprises a double rotation head 20 for playing back frequency-modulated image signals recorded on a VCR tape 10, an amplifying unit 30 for amplifying the frequency-modulated image signals played back by the head 20 at a predetermined amplification factor, a demodulating unit 40 for demodulating an output signal from the amplifying unit 30 to an original composite signal, and a signal detecting unit 50 for detecting vertical synchronizing signal components $V_{sync}$ from the original composite image signal. In accordance with the present invention, the apparatus also comprises a level detecting unit 60 for detecting the level of the output signal from the amplifying unit 30, a comparing unit 70 for comparing the output signal from the level detecting unit 60 with a reference voltage $V_1$, a switching unit 80 operable according to the output signal from the comparing unit 70, and a limiting unit 90 for limiting the output signal from the demodulating unit 40 to a predetermined limit voltage $V_2$ via the switching unit 80 upon the operation of the switching unit 80.

The head 20 may be a head for a SP mode or a LP mode. It may be also a combined SP/LP type head. The construction shown in FIG. 8 can be applied to either head as mentioned above.

The reference voltage $V_1$ of the comparing unit 70 is a predetermined minimum output voltage of the amplifying unit 30 demodulatable by the demodulating unit 40. The limit voltage $V_2$ of the limiting unit 90 is predetermined as a pedestal level voltage of the composite image signal outputted from the demodulating unit 40. The reference voltage $V_1$ and the limit voltage $V_2$ are determined, after many tests carried out upon designing the system. The pedestal level voltage means the lowest level voltage in the composite image signal outputted from the demodulating unit 40. The lowest level voltage does not include the vertical synchronizing signal components of the composite image signal.

Now, the operation of the apparatus with the construction of FIG. 8 will be described, in conjunction with FIGS. 9a to 9e.

When the VCR operates in a SP variable playback mode, the head 20 detects a frequency-modulated image signal from the VCR tape 10 and sends it to the amplifying unit 30. Generally, the image signals recorded on the VCR tape 10 are signals obtained by frequency-modulating original composite image signals.

The amplifying unit 30 amplifies the received image signal at a predetermined amplification factor and outputs a signal shown in FIG. 9a. In the demodulating unit 40, the output signal from the amplifying unit 30 is demodulated, to obtain an original composite image signal shown in FIG. 9b.

Figure 1:
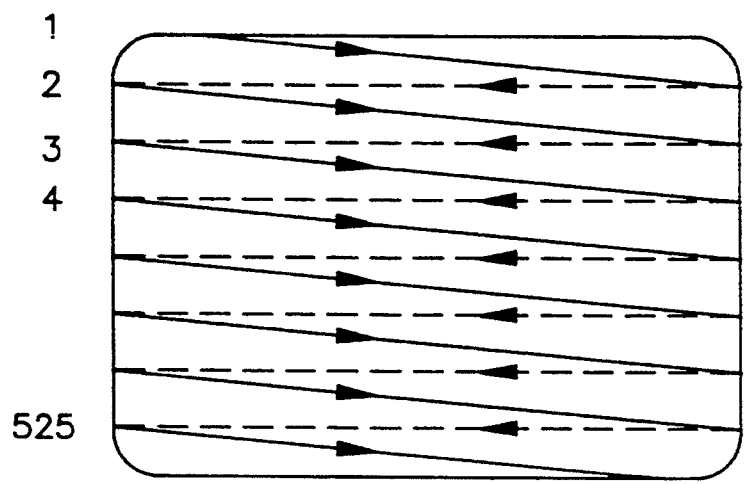
FIG. 1 is a schematic view explaining a signal scanning.
Figure 2:
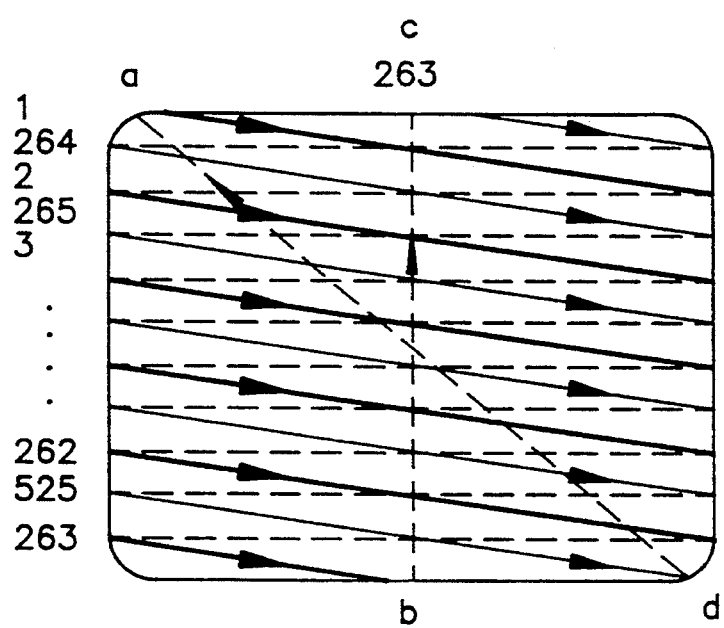
FIG. 2 is a schematic view explaining an interlaced scanning.
Figure 3:
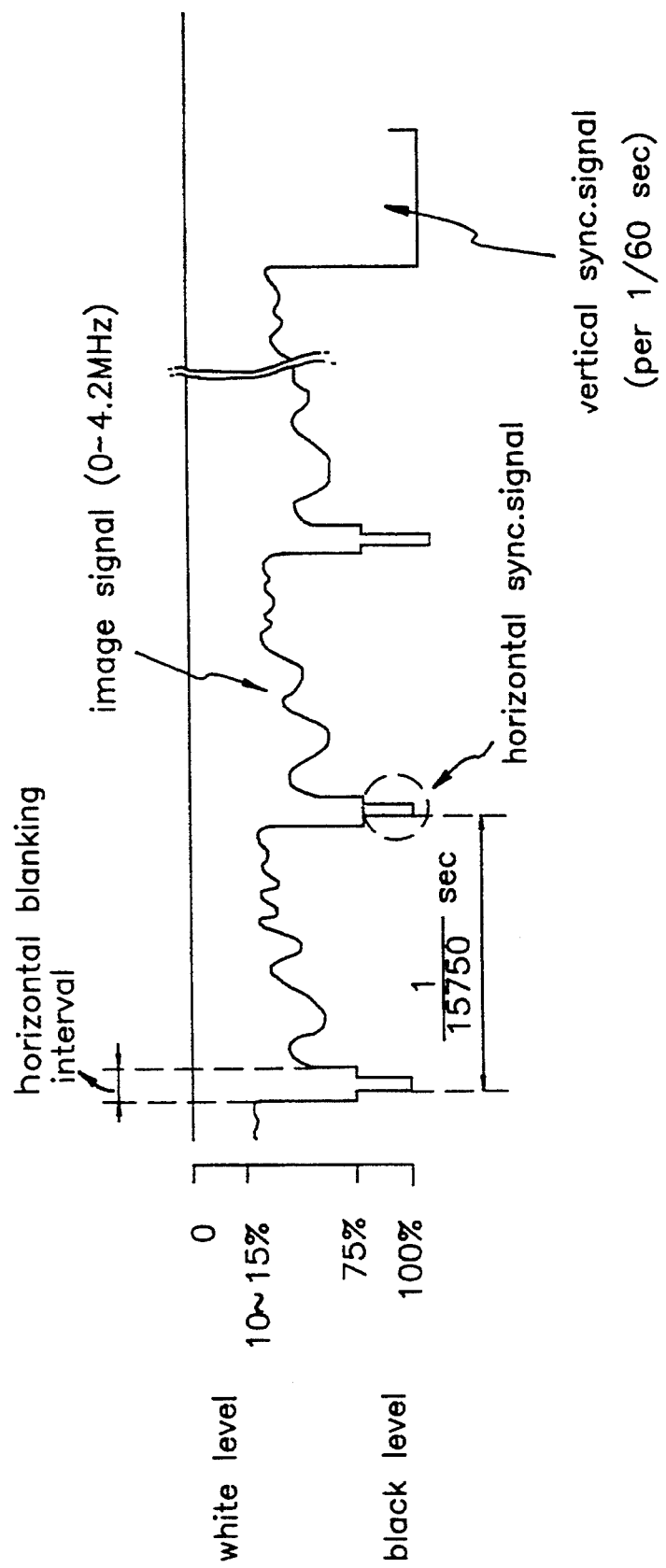
FIG. 3 is a waveform diagram of NTSC broadcast signals in an interlaced scanning system.
Figure 6:
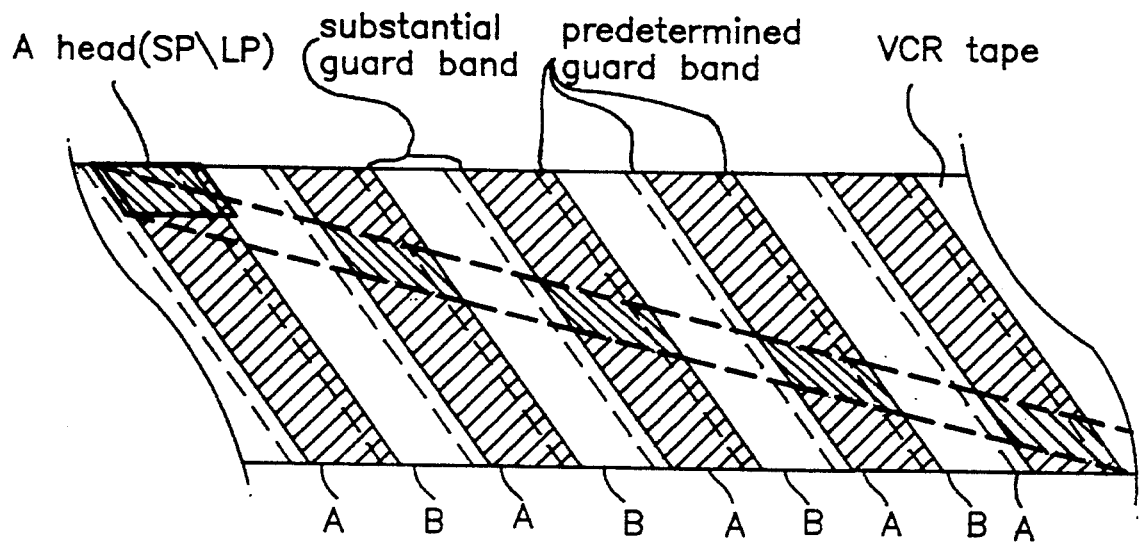
FIG. 6 is a schematic view explaining an image track scanning of a combined SP/LP type head during a variable playback operation at a velocity of 5 times.
Figure 7:
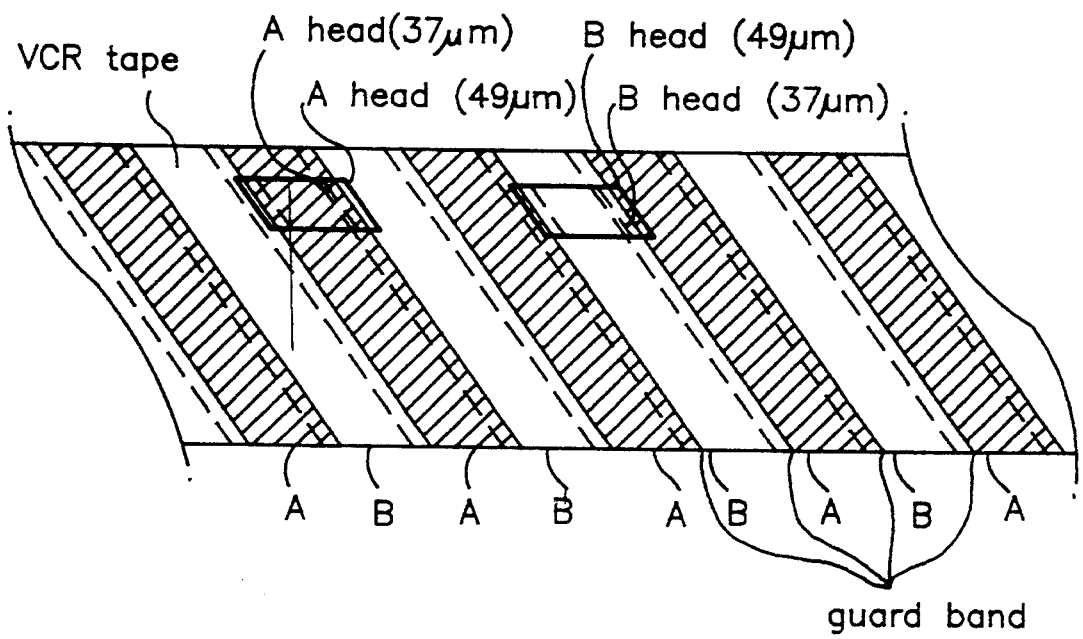
FIG. 7 is a schematic view explaining a variation in guard band width of a VCR tape when the width of head is reduced.

The head 20 has a width of about 37 μm so as to be suitable for both the SP mode and the LP mode. Accordingly, the guard band is increased due to the width difference of about 12 μm from the head width of 49 μm for the optimum SP operation, when the VCR carries out a variable playback operation in the SP mode. As a result, there is no frequency-modulated image signal or frequency-modulated image signals with a small level at guard band intervals K, as shown in FIG. 7a.

The demodulating unit 40 outputs signals with noise bars having a level lower than the low level of the vertical synchronizing signal components at the guard band intervals K, as shown in FIG. 9b.

On the other hand, the level detecting unit 60 detects the level of an output signal from the amplifying unit 30. The comparing unit 70 compares an output signal from the level detecting unit 60 with the reference voltage $V_1$ predetermined as the demodulatable minimum output value from the amplifying unit 30. Since the output signal from the amplifying unit 30 is exhibited to be lower than the reference voltage $V_1$ at the guard band intervals K, the comparing unit 70 outputs a high level signal at the guard band intervals K, as shown in FIG. 9c.

Accordingly, the switching unit 80 is switched on at the guard band intervals K by the high level signal outputted from the comparing unit 70, thereby causing the output of the demodulating unit 40 to be coupled to the limiting unit 90.

Therefore, the output signal from the demodulating unit 40 shown in FIG. 9b is limited to the limit voltage $V_2$ predetermined as the pedestal voltage of the image signal, by the limiting unit 90.

As shown in FIG. 9d, accordingly, components having a voltage lower than the limit voltage $V_2$ are removed from the output signal from the demodulating unit 40, at the guard band intervals K.

Finally, the signal detecting unit 50 detects only vertical synchronizing signal components from the output signal from the demodulating unit 40, which output signal has been limited to the limit voltage $V_2$, as shown in FIG. 9e.

At this time, the detection can be accurately achieved, since noise bars having a voltage lower than the actual voltage of the vertical synchronizing signal components are removed from the output signal from the demodulating unit 40, at the guard band intervals K.

Although the above-mentioned operation has been made for the variable playback mode of VCR, it can be equivalently applied for the SP/LP mode of VCR.

Also, the construction of FIG. 8 which has been applied for the double rotation head with a combined SP/LP function can be applied for a case that the head is used for a single function of SP or LP. In this case, the problem that vertical synchronizing signal components are hardly separated from the image signal, due to another noise can be also solved.

Generally, VCRs have an OSD function, as well as the playback function and the recording function. When vertical synchronizing signal components are inaccurately separated from a played-back image signal, it may be impossible to recognize characters on a screen during the OSD operation of VCR, since frames displayed on the screen is downwardly moved at a high rate. In accordance with the present invention, however, the vertical synchronizing signal components can be accurately separated from a composite image signal, in all cases of using the combined head for the SP/LP mode and using the single head for the SP mode or the LP mode. Accordingly, it is possible to achieve an accurate OSD function as well as a stability of frames, during the playback operation of VCR.

Although the preferred embodiments of tile invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for separating vertical synchronizing signal components from a composite image signal played back from a tape in a video cassette recorder, comprising;

amplifying means for frequency modulating and amplifying the composite image signal;

demodulating means for demodulating an output signal from the amplifying means, to generate a composite image signal with an original frequency;

level detecting means for detecting a level of the output signal from the amplifying means;

comparing means for comparing an output signal from the level detecting means with a predetermined reference value;

switching means operable according to an output signal from the comparing means;

limiting means for limiting an output signal from the demodulating means to a predetermined limit value upon operation of the switching means; and vertical synchronizing signal detecting means for detecting vertical synchronizing signal components from the output signal from the demodulating means.

2. Apparatus of claim 1, wherein the predetermined reference value of the comparing means is a minimum output value of the amplifying means, which is demodulated by the demodulating means.

3. The apparatus of claim 1, wherein the predetermined limit value of the limiting means is a pedestal value of the composite image signal with the original frequency output from the demodulating means.

4. The apparatus of claim 1, wherein said limiting means limits the output signal from said demodulating means at guard band intervals.

5. An apparatus for separating a vertical synchronizing signal from a composite image signal, comprising:

signal limiting means for limiting an amplitude of said composite image signal at guard band intervals by comparing the amplitude of said composite image signal to a reference voltage and outputting the amplitude of said composite image signal if the amplitude of said composite image signal is greater than said reference voltage and outputting said reference voltage if the amplitude of said composite image signal is less than said reference voltage; and vertical synchronizing signal detecting means for detecting a vertical synchronizing signal from an output signal of said signal limiting means.

6. The apparatus of claim 5, said signal limiting means including, level detecting means for detecting a level of said composite image signal;

comparing means for comparing an output of said level detecting means with a predetermined reference value; and limiting means for outputting said predetermined reference value when the amplitude of said composite image signal is less than said predetermined reference value.

7. The apparatus of claim 6, further comprising:

amplifying means for frequency modulating and amplifying said composite image signal; and demodulating means for demodulating an output of said amplifying means.

8. The apparatus of claim 7, wherein the predetermined reference value of the comparing means is a minimum output value of the amplifying means, which is demodulated by the demodulating means.

9. The apparatus of claim 5, wherein the predetermined limit value of the limiting means is a pedestal value of said composite image signal with the original frequency output from said demodulating means.

* * * * *